United States Patent
Michibata et al.

(10) Patent No.: US 10,862,160 B2
(45) Date of Patent: Dec. 8, 2020

(54) ALL-SOLID-STATE LITHIUM-SULFUR BATTERY AND PRODUCTION METHOD FOR SAME

(71) Applicants: TOKYO ELECTRIC POWER COMPANY HOLDINGS, INCORPORATED, Tokyo (JP); TOKYO METROPOLITAN UNIVERSITY, Tokyo (JP)

(72) Inventors: Hideo Michibata, Tokyo (JP); Kiyoshi Kanamura, Tokyo (JP); Mao Shoji, Tokyo (JP)

(73) Assignees: TOKYO ELECTRIC POWER COMPANY HOLDINGS, INCORPORATED, Tokyo (JP); TOKYO METROPOLITAN UNIVERSITY, Tokyo (JP)

( * ) Notice: Subject to any disclaimer, the term of this patent is extended or adjusted under 35 U.S.C. 154(b) by 0 days.

(21) Appl. No.: 16/082,407

(22) PCT Filed: Mar. 9, 2017

(86) PCT No.: PCT/JP2017/009358
§ 371 (c)(1),
(2) Date: Nov. 2, 2018

(87) PCT Pub. No.: WO2017/155011
PCT Pub. Date: Sep. 14, 2017

(65) Prior Publication Data
US 2019/0273282 A1    Sep. 5, 2019

(30) Foreign Application Priority Data

Mar. 11, 2016  (JP) .................................. 2016-048271
Feb. 27, 2017  (JP) .................................. 2017-034652

(51) Int. Cl.
*H01M 10/00* (2006.01)
*H01M 10/0562* (2010.01)
(Continued)

(52) U.S. Cl.
CPC ....... *H01M 10/0562* (2013.01); *H01M 4/134* (2013.01); *H01M 4/382* (2013.01);
(Continued)

(58) Field of Classification Search
CPC ....... H01M 2004/027; H01M 10/0562; H01M 4/625; H01M 10/052; H01M 2300/0071
See application file for complete search history.

(56) References Cited

U.S. PATENT DOCUMENTS

| | | | | |
|---|---|---|---|---|
| 2014/0080006 | A1* | 3/2014 | Ogasa | H01M 4/485 429/319 |
| 2014/0342209 | A1* | 11/2014 | He | H01M 10/056 429/101 |
| 2016/0240840 | A1* | 8/2016 | He | H01M 4/5815 |

FOREIGN PATENT DOCUMENTS

| JP | 2004119367 A | 4/2004 |
|---|---|---|
| JP | 2007294429 A | 11/2007 |

(Continued)

OTHER PUBLICATIONS

International Search Report issued in PCT/JP2017/009358, dated Sep. 14, 2017 (5 pages).
(Continued)

*Primary Examiner* — Cynthia H Kelly
*Assistant Examiner* — Monique M Wills
(74) *Attorney, Agent, or Firm* — Osha Bergman Watanabe & Burton LLP

(57) ABSTRACT

(Problem to be Solved)
The present application is to provide an all-solid-state lithium-sulfur battery that experiences little reduction in
(Continued)

battery performance even after repeated charging/discharging cycling, does not generate toxic gas when damaged, and does not require addition of equipment or the like for management of moisture or oxygen concentration; and a production method for the all-solid-state lithium-sulfur battery.

(Means for Solution)

The present invention uses a positive electrode that contains sulfur and a conductive material, a negative electrode that contains lithium metal, and, as an electrolyte layer that is interposed between the positive electrode and the negative electrode, an oxide solid electrolyte to achieve a high-performance all-solid-state lithium-sulfur battery. According to the present invention, after a positive electrode slurry that contains sulfur is applied to a positive electrode side of an oxide solid electrolyte formation body and dried to form a positive electrode, the oxide solid electrolyte molded body is mounted upon a lithium foil that will become a negative electrode and adhered to the lithium foil. Said process allows for efficient assembly of a battery cell that is configured to have an oxide solid electrolyte interposed between a positive electrode and a negative electrode.

16 Claims, 1 Drawing Sheet

(51) Int. Cl.
  *H01M 4/134* (2010.01)
  *H01M 4/38* (2006.01)
  *H01M 4/62* (2006.01)
  *H01M 10/052* (2010.01)
  *H01M 10/058* (2010.01)
  *H01M 4/02* (2006.01)

(52) U.S. Cl.
  CPC ........... *H01M 4/621* (2013.01); *H01M 4/625* (2013.01); *H01M 10/052* (2013.01); *H01M 10/058* (2013.01); *H01M 2004/027* (2013.01); *H01M 2004/028* (2013.01); *H01M 2220/20* (2013.01); *H01M 2300/0071* (2013.01)

(56) References Cited

FOREIGN PATENT DOCUMENTS

| | | |
|---|---|---|
| JP | 201151855 A | 3/2011 |
| JP | 2012204332 A | 10/2012 |
| JP | 2013114920 A | 6/2013 |
| JP | 2013191547 A | 9/2013 |
| JP | 201429777 A | 2/2014 |
| JP | 2015179615 A | 10/2015 |
| WO | 2016063877 A1 | 4/2016 |

OTHER PUBLICATIONS

Written Opinion of the International Searching Authority issued in PCT/JP2017/009358, dated Sep. 14, 2017 (10 pages).

Office Action (Decision to Grant a Patent) issued in corresponding Japanese Application No. 2017-034652, dated Mar. 14, 2018 (6 pages).

* cited by examiner

ALL-SOLID-STATE LITHIUM-SULFUR BATTERY AND PRODUCTION METHOD FOR SAME

TECHNICAL FIELD

The present invention relates to an all-solid-state lithium-sulfur battery using a solid electrolyte as an electrolyte, and a production method for the all-solid-state lithium-sulfur battery. In detail, the present invention relates to an all-solid-state lithium-sulfur battery including a positive electrode that contains a mixture of sulfur and conductive carbon black, a negative electrode that contains lithium metal, a solid electrolyte including lithium composite oxide, as constituent materials, and a production method for the all-solid-state lithium-sulfur battery.

BACKGROUND ART

In recent years, electronic apparatuses such as AV apparatus and personal computer, communication apparatuses, and the like, have been rapidly becoming more portable and cordless. For power sources of such electronic apparatuses and communication apparatuses, secondary batteries having high energy density and excellent load characteristics have been demanded. Use of lithium secondary batteries having high voltage, high energy density, and excellent cycle characteristics has been expanding.

Meanwhile, popularization of electric vehicles and promotion of use of natural energy require a battery having much higher energy density. Development of a lithium secondary battery that replaces lithium-ion secondary batteries including lithium composite oxide such as $LiCoO_2$ as a positive electrode material has been desired.

Since sulfur has a very high theoretical capacity density as 1675 mAh/g, a lithium-sulfur battery (hereinafter, referred to as an "Li—S battery") including sulfur as a positive electrode material is a battery that has possibility of achieving the theoretically highest energy density. Many universities, manufacturers, etc., are working on development of the Li—S battery, although still in a basic research stage.

When an organic electrolytic solution is used as an electrolyte of a Li—S battery, there is a problem that a sulfur molecule, a reaction intermediate (for example, lithium polysulfide), and the like, are dissolved and diffuses in the organic electrolytic solution, for example, during charging and discharging, thus causing occurrence of self-discharge or deterioration of a negative electrode, thereby deteriorating battery performance.

Therefore, there have been provided a method of modifying an electrolytic solution by adding acids such as hydrochloric acid and nitric acid to an electrolytic solution (see PTL 1), a method using a composite including sulfur nanoparticles in Ketjen black, as a positive electrode material (see PTL 2), and the like. However, in these methods, since an electrolyte itself is liquid, it is not possible to completely suppress dissolving of sulfur molecules or polysulfide ions into an electrolytic solution. Therefore, a sufficient effect may not be obtained.

As a method for solving such a problem of the electrolytic solution, a method using a solid electrolyte is considered. However, there are few approaches of using an oxide-based solid electrolyte as a solid electrolyte. Even if such approaches are considered, chemically stable materials such as $LiCoO_2$ are used. In general, deterioration of battery performance is small, but the battery performance itself tends to be low.

Accordingly, as a solid electrolyte for a Li—S battery, a sulfide-based solid electrolyte is generally employed (see PTL 3). The sulfide-based solid electrolyte tends to have lower internal resistance and higher energy density than the other solid electrolytes. However, the battery performance is severely deteriorated by charge/discharge cycle, and problems of lifetime and safety remain.

Furthermore, the sulfide-based solid electrolyte is low in chemical stability, and may be reacted with an electrode material, and severely reduced in electrical conductivity. Furthermore, the sulfide-based solid electrolyte reacts with water or oxygen, and generates toxic gas such as hydrogen sulfide and sulfur oxide. Accordingly, a safety measure is needed. For example, production of the sulfide-based solid electrolyte or assembling of a battery needs to be carried out inside a glove box that can control water and oxygen. Also, since the sulfide-based solid electrolyte has low strength and is easily cracked and peeled off, careful handling is needed. Alternatively, also if a battery is damaged, it becomes necessary to have a battery structure in which a sulfide-based solid electrolyte is not easily exposed to the outside air, device of incorporating a member for absorbing toxic gas into a battery, or the like.

PRIOR ART

Patent Literature

PTL 1: Japanese Patent Unexamined Publication No. 2013-114920

PTL 2: Japanese Patent Unexamined Publication No. 2012-204332

PTL 3: Japanese Patent Unexamined Publication No. 2015-179615

SUMMARY OF INVENTION

Problems to be Solved by the Invention

An object of the present invention is to provide an all-solid-state lithium-sulfur battery that undergoes little deterioration of battery performance even if charge/discharge cycles are repeated, does not generate toxic gas if the battery is damaged, and does not require special equipment or the like for controlling water or oxygen concentration; and a production method for the all-solid-state lithium-sulfur battery.

Means for Solving the Problems

In order to solve the above-mentioned problems, the inventors of the present invention have made intensive studies, and as a result, they have found that a solid battery having high performance and less deterioration in performance can be obtained by using an oxide-based solid electrolyte as an electrolyte, and by preferably employing lithium-lanthanum-zirconium composite oxide as the oxide-based solid electrolyte.

Furthermore, they found that a battery cell having a configuration in which an oxide-based solid electrolyte is interposed between the positive electrode and the negative electrode can be efficiently assembled by applying positive electrode slurry containing sulfur onto a predetermined position on one side of a molded body formed by molding an oxide-based solid electrolyte, drying the slurry to form a positive electrode, and then mounting metallic lithium such as a lithium foil as a negative electrode on the other surface of the oxide-based solid electrolyte molded body, thus completing the present invention.

That is, the present invention is as follows.

(1) An all-solid-state lithium-sulfur battery comprising a positive electrode that contains sulfur and a conductive material, a negative electrode that contains lithium metal, and a layer of a solid electrolyte interposed between the positive electrode and the negative electrode, wherein the solid electrolyte is an oxide-based solid electrolyte, and an electroconductive layer is not provided between the positive electrode and the layer of the solid electrolyte.

(2) The all-solid-state lithium-sulfur battery described in the above (1), wherein the oxide-based solid electrolyte is lithium composite oxide.

(3) The all-solid-state lithium-sulfur battery described in the above (2), wherein the lithium composite oxide is lithium-lanthanum-zirconium composite oxide.

(4) The all-solid-state lithium-sulfur battery described in the above (3), wherein the lithium-lanthanum-zirconium composite oxide is a composite oxide further containing one or more elements selected from aluminum, tantalum, niobium, and bismuth.

(5) The all-solid-state lithium-sulfur battery described in any one of the above (1) to (4), wherein the positive electrode contains sulfur and conductive carbon black in (a mass ratio of) 70/30 to 95/5.

(6) The all-solid-state lithium-sulfur battery described in any one of the above (1) to (5), wherein the positive electrode further contains a binder.

(7) The all-solid-state lithium-sulfur battery described in any one of the above (1) to (6), wherein the negative electrode is a lithium foil.

(8) The all-solid-state lithium-sulfur battery described in any one of the above (1) to (7), wherein an operating temperature is 110° C. or less.

(9) A motor vehicle equipped with the all-solid-state lithium-sulfur battery described in any one of the above (1) to (8).

(10) An electric power storage system configured to supply electric power from an all-solid-state lithium-sulfur battery described in any one of the above (1) to (8) to an electric power network, or to supply electric power from the electric power network to the all-solid-state lithium-sulfur battery.

(11) A production method for an all-solid-state lithium-sulfur battery that comprises a positive electrode that contains sulfur, a negative electrode that contains lithium metal, a layer of an oxide-based solid electrolyte interposed between the positive electrode and the negative electrode, the method comprising:

a step of attaching a masking tape with a portion for forming the positive electrode unmasked, at a positive electrode side of an oxide-based solid electrolyte molded body;

a step of forming the positive electrode on the oxide-based solid electrolyte molded body by applying positive electrode slurry containing sulfur onto a portion of the oxide-based solid electrolyte molded body in a portion that is not covered with the masking tape at the positive electrode side, uniformly spreading the slurry, solidifying the slurry by vacuum drying, and then removing the masking tape; and a step of assembling a cell by mounting a lithium foil on a negative electrode current collector, mounting the oxide-based solid electrolyte molded body such that a negative electrode surface is brought into contact with the lithium foil, and further mounting the positive electrode current collector on the positive electrode.

(12) The production method for an all-solid-state lithium-sulfur battery according to claim 11, wherein the method for comprising heat-treating the lithium foil to bring the lithium foil into close contact with the solid electrolyte molded body, after mounting the oxide-based solid electrolyte molded body such that the negative electrode surface is brought into contact with the lithium foil.

(13) The production method for an all-solid-state lithium-sulfur battery described in the above (11) or (12), wherein the oxide-based solid electrolyte is lithium-lanthanum-zirconium composite oxide.

(14) The production method for an all-solid-state lithium-sulfur battery described in the above (13), wherein the lithium-lanthanum-zirconium composite oxide is a composite oxide further containing one or more elements selected from aluminum, tantalum, niobium or bismuth.

(15) The production method for an all-solid-state lithium-sulfur battery described in any one of the above (11) to (14), wherein the positive electrode slurry is obtained by adding an organic solvent to a mixture including 70 to 95% by mass of sulfur, and 5 to 30% by mass of conductive carbon black.

(16) The production method for an all-solid-state lithium-sulfur battery described in the above (15), wherein the organic solvent is an organic solvent for a lithium ion battery.

(17) The production method for an all-solid-state lithium-sulfur battery described in any one of the above (11) to (16), wherein the positive electrode current collector is a stainless steel foil or an aluminum foil, and the negative electrode current collector is a copper foil.

Effects of the Invention

Since an all-solid-state lithium-sulfur battery of the present invention uses a solid electrolyte including lithium composite oxide as a solid electrolyte, unlike the case of a sulfide-based solid electrolyte, there is little risk of reaction with an electrode material. Thus, it is possible to suppress deterioration of the battery performance. An operating temperature is 110° C. or less and therefore high safety is achieved.

Furthermore, the lithium composite oxide does not react with water or oxygen, so that there is no risk of generating toxic gas. Therefore, a battery having high safety can be obtained. Furthermore, since it is not necessary to consider influence of water and oxygen at the time of formation of an electrolyte or assembling of a battery cell, it is not necessary to add special equipment, so that a battery can be produced efficiently.

Furthermore, according to a production method for an all-solid-state lithium-sulfur battery of the present invention, since a positive electrode can be formed in a state in which the positive electrode is in a close contact with a solid electrolyte including lithium composite oxide, it is possible to suppress the increase in the interface resistance due to contact failure at the interface between the electrolyte and the positive electrode. Thus, it is not necessary to provide an electroconductive layer between the positive electrode and the solid electrolyte.

In the present invention, metallic lithium such as a lithium foil is bonded to a negative electrode side surface of a lithium-lanthanum-zirconium composite oxide (hereinafter, also referred to as "LLZ") molded body, that is, a surface opposite to a surface on which the positive electrode material is formed, and heated at, for example, about 60 to 170° C., so that contact property (close-contact property) between the negative electrode and the solid electrolyte can be improved so as to reduce the surface resistance. Alternatively, before a positive electrode material is formed on a surface of the LLZ molded body, a gold thin film may be formed by sputtering on a surface of LLZ at a negative electrode side in advance. When the battery cell is assembled, the gold thin film and metallic lithium as a negative electrode are bonded to each other, and heated at 60 to 170° C. if necessary. As a result, the metallic lithium and gold are alloyed, so that the interface resistance between the negative electrode and the solid electrolyte can be reduced.

EMBODIMENTS FOR CARRYING OUT THE INVENTION

Figure 1:
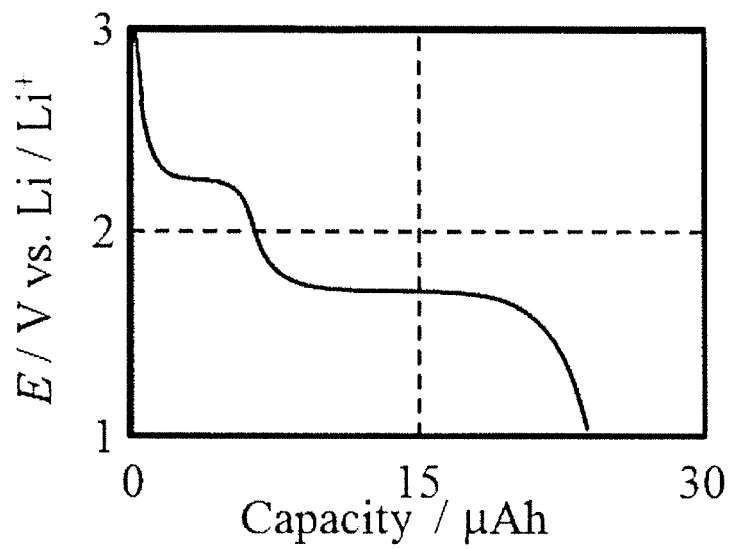
FIG. 1 is a view showing a result of measurement of a discharge curve by cyclic voltammetry (CV) of an all-solid-state lithium-sulfur battery of Example 1.

In an all-solid-state lithium-sulfur battery of the present invention, it is important to use an oxide-based solid electrolyte as a solid electrolyte, and it is preferable to use lithium composite oxide as an oxide-based solid electrolyte.

Preferable examples of the lithium composite oxide include lithium-lanthanum-zirconium composite oxide, lithium-lanthanum-titanium composite oxide, lithium-niobium composite oxide, lithium-niobium-zirconium composite oxide, and the like, and lithium-lanthanum-zirconium composite oxide (LLZ) is preferable. LLZ is a stable material that is not reduced even with metallic lithium.

LLZ is a composite oxide including lithium, lanthanum, and zirconium having a basic composition of $Li_7La_3Zr_2O_{12}$, but it may contain one or more elements selected from aluminum, tantalum, niobium, bismuth, or the like, as necessary.

A production method for LLZ of the present invention can use a well-known method. Examples of the method include a method disclosed in Japanese Patent Unexamined Publication 2015-146299.

That is, as an example, a stoichiometric amount of lanthanum compound powder and zirconium compound powder are mixed while pulverizing, molded using a press machine, and then fired in an electric furnace at preferably 1300 to 1700° C. to form a lanthanum-zirconium oxide molded body. This molded body has porosity of preferably 75% or more, and more preferably 80 to 90%. When the porosity is 75% or more, the molded body is easily impregnated with a lithium compound. On the other hand, when the porosity is 90% or less, strength of the molded body can be maintained. The porosity is a value calculated from the all pore volume ($cm^3/g$) by a mercury press-in method (conforming to JIS R 1655) and apparent density ($cm^3/g$) measured from the Archimedes' method. The porosity can be adjusted by a firing temperature and the like.

Subsequently, an aqueous solution of a stoichiometric amount of lithium compound is added to the lanthanum-zirconium oxide molded body, and the inside of pores of the lanthanum-zirconium oxide molded body is impregnated with a lithium compound, followed by firing in a microwave firing furnace. Thus, LLZ of the present invention can be formed. Use of microwave as a heat source makes it possible to obtain a dense sintered body of LLZ. The firing temperature is preferably 200 to 500° C., and more preferably 300 to 450° C. When hot air or infrared rays are used as a heat source, since a lithium compound is reacted in a heated portion, the reaction proceeds only on a surface of the molded body, thus making it difficult to obtain a dense molded body having an $Li_7La_3Zr_2O_{12}$ structure. Irradiation with microwave having frequency of 1 to 300 GHz, and usually 2.45 GHz is carried out. A preferable method is a method of adjusting output of the microwave in a range from 1.5 to 9.5 kW, and controlling the microwave irradiation by, for example, PID control to maintain a temperature after it reaches a predetermined firing temperature.

The lithium compound with which the lanthanum-zirconium oxide molded body is impregnated is used such that a molar ratio of lithium, lanthanum, and zirconium is 7:3:2 according to the basic composition of LLZ.

The lanthanum compound is not particularly limited. For example, lanthanum hydroxide, lanthanum oxide, lanthanum chloride, lanthanum nitrate, and the like, can be used. Lanthanum hydroxide, which generates less toxic gas while firing, is preferable.

The zirconium compound is not particularly limited. For example, zirconium oxide, zirconium chloride, zirconium nitrate, zirconium acetate, and the like, can be used. Zirconium oxide, which generates less toxic gas while firing, is preferable.

The lithium compound is not particularly limited. For example, lithium hydroxide, lithium oxide, lithium chloride, lithium nitrate, lithium sulfate, lithium acetate, and the like, can be used. Among them, since solubility in water is high and less toxic gas is generated while firing, lithium hydroxide (LiOH), or lithium oxide ($Li_2O$) dissolved in water to become lithium hydroxide is preferable.

A method for impregnating a lanthanum-zirconium oxide molded body with lithium is not particularly limited as long as a method is capable of impregnating the molded body with a stoichiometric amount of lithium. Examples thereof include the following methods.

(1) A lanthanum-zirconium oxide molded body is impregnated with a part of a solution in which a necessary amount of lithium compound is dissolved in a solvent, and then, the molded body is dried to remove a solvent. The above-mentioned molded body is impregnated with a part of the above-mentioned solution again, and then, the molded body is dried to remove a solvent. Then, impregnation and drying are repeated until the prepared solution is used up.

(2) A lanthanum-zirconium oxide molded body is impregnated with slurry in which a necessary amount of lithium hydroxide and the like diffuses in a small amount of water. In this case, as lithium hydroxide, it is preferable to use fine particulate lithium hydroxide that easily permeates pores (air gaps) of the molded body.

(3) Li salt (for example, LiCl) having high solubility is dissolved in water to prepare high-concentration LiCl aqueous solution, and the lanthanum-zirconium oxide molded body is impregnated with the aqueous solution.

(4) Powdery LiOH is added into a lanthanum-zirconium oxide molded body, and the lanthanum-zirconium oxide molded body is impregnated with LiOH by thermal melting. In this case, the melting temperature is preferably the melting point of LiOH (462° C.) or higher.

The shape or size of LLZ are not particularly limited. Depending on structures of the battery, the shape may be, for example, a plate shape, a sheet shape, a cylindrical shape, or the like.

In the present invention, sulfur is used as an active material of the positive electrode. However, since there is a problem that sulfur itself is poor in electrical conduction property, it is necessary to use a conductive material together. The conductive material is not particularly limited as long as it is a material having electrically conductivity. Examples thereof include conductive carbon blacks such as acetylene black, Ketjen black, channel black, and furnace black, graphite such as natural graphite such as flake graphite and artificial graphite, conductive fibers such as carbon fiber and metal fiber, metal powder of copper, silver, etc., organic conductive materials such as a polyphenylene compound, a carbon nanotube, and the like. Among them, carbon blacks are preferable because they have a porous structure and exhibit an effect as a binder by taking sulfur into the porous structure, and have high electric conductivity. Acetylene black and Ketjen black are particularly preferable. The conductive carbon blacks have a Brunauer-Emmett-Teller (BET) specific surface area by nitrogen gas adsorption method of preferably 10 $m^2$/g or more, more preferably 50 $m^2$/g or more, and further preferably 100 $m^2$/g or more.

When the content of the conductive carbon blacks used in mixture with sulfur is too small, ensuring conductivity and the binder effect cannot be expected. On the contrary, when the content is too large, a sulfur content is reduced, thus deteriorating the capacity density of the battery is used. Therefore, it is preferable that content of sulfur is in a range from 70 to 95% by mass, and that of conductive carbon black is in a range from 5 to 30% by mass. It is more preferable that sulfur is in a range from 80 to 90% by mass, and the conductive carbon black is in a range from 10 to 20% by mass.

The negative electrode of the present invention is not particularly limited as long as it contains a material that occludes and releases a lithium ion, as a negative electrode active material. Examples thereof include lithium metal such as a lithium foil, a lithium alloy that is an alloy of lithium with aluminum, silicon, tin, magnesium, and the like, and in addition to them, metallic oxide, metallic sulfide, a carbon material, and the like, capable of occluding and releasing a lithium ion. In view of high theoretical capacity density, easiness in handling, and easiness in assembling a battery cell, lithium metal is preferable.

A current collector is not particularly limited. For example, metal such as copper, aluminum, nickel, and stainless steel, can be used. As the negative electrode current collector, copper is preferably used because it can be processed into a thin film, and not easily alloyed with lithium. As the positive electrode current collector, a stainless steel foil, and an aluminum foil are preferably used because they are inexpensive.

In the all-solid-state lithium-sulfur battery of the present invention, since the positive electrode material contains sulfur and a conductive material, and oxide-based solid electrolyte is used as a solid electrolyte, the all-solid-state lithium-sulfur battery is excellent in the electronic conductivity between the positive electrode and the solid electrolyte. Accordingly, between the positive electrode and the solid electrolyte, as well as between the negative electrode and the solid electrolyte, it is not necessary to provide an electroconductive layer containing lithium titanate, and the like. Since titanium in lithium titanate is reduced around 1.5 V, the negative electrode material is limited. Thereby, decrease in the operating voltage may cause decrease in energy density.

Furthermore, since the all-solid-state lithium-sulfur battery of the present invention is excellent in electronic conductivity, the operating temperature is very low as 110° C. or less. Such a low operating temperature facilitates thermal insulation of a battery when a battery is not used, so that final charge-discharge efficiency is improved. As the operating temperature is increased, more thermal energy for thermal insulation of a battery is required, so that the total efficiency is reduced. Meanwhile, the all-solid-state lithium-sulfur battery of the present invention can be a safe battery with very low fire risk. Durability, safety of a battery, and cycle safety can be improved.

Next, a production method for an all-solid-state lithium-sulfur battery of the present invention is described with reference to preferable embodiments.

The production method for an all-solid-state lithium-sulfur battery of the present invention aims to suppress the interface resistance generated in the interface between a solid electrolyte and electrodes by bringing the solid electrolyte into close contact with the positive electrode and the negative electrode as close as possible. The positive electrode is formed such that it is brought into close contact with a predetermined position on the surface opposite to the negative electrode side of the solid electrolyte.

Meanwhile, in formation of the negative electrode, it is preferable that metallic lithium such as a lithium foil is attached to one side of the oxide-based solid electrolyte that is molded in a predetermined shape, and then the lithium foil is brought into close contact with the solid electrolyte molded body by heat-treatment. In this case, heat treatment may be carried out in a state in which a lithium foil is attached to the surface opposite to the positive electrode of the oxide-based solid electrolyte, after the positive electrode is formed on the oxide-based solid electrolyte. Alternatively, a positive electrode may be formed on a surface opposite to a surface of the oxide solid electrolyte on which a lithium foil has been attached after heat treatment is carried out in a state in which a lithium foil is attached to the oxide-based solid electrolyte. A heat-treatment temperature is not particularly limited as long as it softens a lithium foil. The temperature is preferably 60 to 170° C., and more preferably 100 to 140° C.

Alternatively, after a gold thin film is formed by sputtering on one side of the oxide-based solid electrolyte that has been molded in a predetermined shape, metallic lithium such as a lithium foil may be attached so as to form a surface at a negative electrode side. In practice, it is preferable to attach metallic lithium such as a lithium foil to the negative electrode side surface of the oxide-based solid electrolyte molded body without sputtering gold, then heat the metallic lithium, and press the metallic lithium as necessary. This can improve the contact property (close-contact property) between the negative electrode and the solid electrolyte, and reduce the interface resistance.

Specifically, the production method is described with a case as an example where a coin-type battery cell is assembled using lithium-lanthanum-zirconium composite oxide (LLZ) as the oxide-based solid electrolyte.

A stoichiometric amount of lanthanum compound powder and zirconium compound powder are mixed with each other while pulverizing them, the mixture is formed into a plate shape by using a molding die and a press machine, and the plate-shaped mixture is transferred to a firing container and fired in an electric furnace to produce a lanthanum-zirconium oxide molded body. The firing temperature is preferably 1300 to 1700° C.

A molded body of lanthanum-zirconium oxide taken out after natural cooling is placed into the firing container again, and an aqueous solution of a stoichiometric amount of additionally prepared lithium compound is added and the molded body is impregnated with the aqueous solution, followed by firing again to produce a plate-shaped LLZ molded body. The firing temperature is preferably 200 to 500° C. A microwave firing furnace is preferably used as a firing furnace, because the lithium compound that infiltrates into the inside of pores of lanthanum-zirconium oxide can be fired efficiently.

The shape of the plate-shaped LLZ molded body to be produced is not particularly limited. The shape may be selected depending on the size of a coin-type battery to be assembled. When a commercially available battery cell case is used, a circular shape having a diameter of about 12 mm and thickness of about 0.5 to 1 mm is preferable.

A metal thin film is formed by sputtering on one side of the produced LLZ molded body as necessary. A surface of the LLZ molded body on which a metal thin film is formed is a negative electrode side. As metal with which a thin film is formed by sputtering, gold, silver, aluminum, and the like, are preferable, and gold is particularly preferable.

Subsequently, on one side (a surface opposite to the surface having the metal thin film) of the LLZ molded body, a polyimide tape with a positive electrode forming portion cut out is attached as a masking tape. Then, positive electrode slurry is applied to the positive electrode forming portion of the masking tape so as to form a positive electrode. Note here that the masking tape is not limited to polyimide, and may be any polymer that is insoluble in a slurry solvent and does not melt during vacuum drying mentioned below.

The shape or size of the positive electrode forming portion of the masking tape may be any shape or size such that an LLZ molded body portion having a width of at least about 2 mm is left around the formed positive electrode so as not to prevent the positive electrode from protruding to the surrounding of the solid electrolyte. For example, in a case where a coin-type battery is produced using the LLZ molded body having a diameter of about 12 mm, a polyimide tape having a circular positive electrode forming portion having a diameter of about 8 mm may be used as a masking tape.

An appropriate amount of positive electrode slurry is mounted on the positive electrode forming portion of the polyimide tape, the slurry is leveled to be spread flat using a spatula, a glass plate, and the like. Then, a solvent in the positive electrode slurry is removed by vacuum drying. After the solvent is removed, the polyimide tape is peeled off and removed. Thus, it is possible to obtain a positive electrode that is in close contact with the LLZ molded body.

Since a thickness of the applied positive electrode slurry becomes the same as the thickness of the polyimide tape, weight or thickness of the positive electrode can be adjusted by changing a thickness of the polyimide tape to be used.

Conditions of vacuum drying are not particularly limited, but rapid evaporation of a solvent in the positive electrode slurry may inhibit close contact of the positive electrode to the surface of the LLZ molded body. The vacuum drying is preferably at a temperature of about 70 to 90° C. Time is preferably about 10 to 15 hours.

A preparation method of the positive electrode slurry can be carried out by a well-known method. Sulfur and carbon black such as conductive carbon black are mixed with each other at a predetermined ratio, and the mixture is stirred while adding a solvent so as to obtain slurry. As the solvent, a well-known solvent for a lithium ion battery can be used. Examples of the solvent include amide-based solvents such as N-methyl-2-pyrrolidone and dimethyl acetamide, ether-based solvents such as tetrahydrofuran, and hydrocarbon-based solvents such as toluene, xylene, and cyclohexane. These solvents may be used in quantity that exhibit fluidity such that the positive electrode slurry can be transferred to the positive electrode forming portion of a LLZ molded body by using a glass rod and the like, and viscosity such that the positive electrode slurry stays without flowing after the slurry is transferred to the positive electrode forming portion.

The above-mentioned positive electrode slurry can include a binder and other positive electrode active materials as necessary. The adding method of the binder is not particularly limited. For example, a binder can be used as powder, or as a solution in an organic solvent, or as emulsion in water as a solvent. Preferable examples of the organic solvent is N-methyl-2-pyrrolidone.

Examples of the binder include polyvinylidene fluoride (PVDF), vinylidene fluoride-hexafluoropropylene copolymer, vinylidene fluoride-chlorotrifluoroethylene copolymer, vinylidene fluoride-pentafluoropropylene copolymer, vinylidene fluoride-perfluoromethyl vinyl ether-tetrafluoroethylene copolymer, vinylidene fluoride-hexafluoropropylene-tetrafluoroethylene copolymer, ethylene-tetrafluoroethylene copolymer (ETFE), propylene-tetrafluoroethylene copolymer, polyvinylpyrrolidone, polyethylene oxide, polyvinyl alcohol, polyacrylonitrile, polymethyl methacrylate, polyethylene, polypropylene, polytetrafluoroethylene (PTFE), and the like, and polyvinylidene fluoride is preferably used. These binders may be used singly or in combination two or more thereof.

The content of the binder is preferably 0.1 to 10% by mass with respect to the total amount of sulfur, conductive material, and the binder. When the binder is 0.1% by mass or more, retention of sulfur in pores of conductive carbon black such as acetylene black, or fixation of conductive carbon black onto the LLZ molded body can be enhanced more effectively. On the other hand, when the binder is 10% by mass or less, it is possible to avoid reduction of conductivity of the positive electrode material because the binder itself is insulator.

By using, for example, a commercially available a coin-type battery cell case, a lithium foil serving as a negative electrode is placed on the lower cap of the cell case, and the LLZ molded body is mounted such that the lithium foil faces an opposite side of positive electrode forming portion. Subsequently, a metal foil such as a stainless steel foil or an aluminum foil serving as the positive electrode current collector is mounted on the positive electrode of the LLZ molded body. Thus, the battery cell is assembled, and the upper cap of the cell case is covered so as to complete a battery.

As mentioned above, the production method for a battery cell of the present invention is described for a coin-type battery cell as an example. However, the shape of the battery cell is not limited to a coin-type. Examples of the shapes include a button type, a square type, a sheet type, a stacked type, a flat type, a cylindrical type, and the like. It is possible to form a LLZ molded body having a shape suitable for each of the shapes of battery cells.

The application of use of the all-solid-state lithium-sulfur battery of the present invention is not particularly limited. The all-solid-state lithium-sulfur battery can be suitably used for hybrid vehicle, electric vehicle, electric power storage, and the like.

When an electric power is stored using the all-solid-state lithium-sulfur battery of the present invention, an electric power system for supplying electric power from the all-solid-state lithium-sulfur battery to the electric power network is constructed. Alternatively, an electric power system for supplying electric power from electric power network using an electric power source such as thermal power generation, hydroelectric power generation, pumping-up hydraulic power generation, and nuclear power generation, and, in addition, natural energy power generation such as solar power generation and wind power generation to the all-solid-state lithium-sulfur battery is constructed.

EXAMPLES

Hereinafter, the present invention is described specifically with reference to Examples, but the present invention is not necessarily limited to the following Examples alone.

Example 1

First, 33.9 g of lanthanum hydroxide (purity: 99.9%, manufactured by Shin-Etsu Chemical Co., Ltd) and 14.7 g of zirconium oxide (manufactured by Tosoh Corporation) were weighed, and mixed with each other while pulverizing them with a ball mill for one hour. From the obtained powder, 0.26 g of the powder was weighed and taken out, poured into a molding die having a predetermined size, and molded using a uniaxial press machine so as to produce ten disk-shaped molded bodies each having a diameter of 13 mm and a thickness of 1 mm. The produced molded bodies were transferred to ceramic firing containers, respectively, and fired in an electric furnace at 1500° C. for 36 hours, followed by naturally cooling to obtain a lanthanum-zirconium oxide molded bodies.

Additionally, 2.8 g of lithium hydroxide (manufactured by KANTO CHEMICAL CO., INC.) was dissolved in 30 ml of water to prepare a lithium aqueous solution, and 1.0 ml of the prepared lithium aqueous solution was weighed and taken out, and respectively added into the ceramic firing containers containing the lanthanum-zirconium oxide molded bodies.

Subsequently, the ceramic firing container was transferred to a microwave firing furnace and irradiated with microwave and fired at a furnace temperature of 400° C. for 36 hours to obtain a lithium-lanthanum-zirconium composite oxide molded bodies (LLZ molded body) each having a diameter of about 12 mm and a thickness of about 0.5 mm.

Using one of the obtained LLZ molded bodies (diameter was 12 mm, thickness was 0.51 mm, and mass was 0.2647 g), gold was sputtered to a surface that was defined as a negative electrode side, and then a positive electrode was formed on a surface opposite side to the negative electrode side.

A purpose of this Example is to test and evaluate the positive electrode and LLZ, in order to reduce the effect on battery characteristics from the negative electrode side as small as possible, gold was sputtered at the negative electrode side for reliably forming the contact between LLZ and metallic lithium and for making the resistance low.

The positive electrode was formed as follows.

That is, a ring-shaped masking tape was formed by cutting out an 8-mm diameter circle concentrically around the center of a 12-mm diameter circular polyimide tape (thickness: 0.09 mm). The ring-shaped masking tape was attached to a surface at the positive electrode side of the LLZ molded body side. The 8-mm diameter circular portion surrounded by the ring-shaped masking tape was made to be a positive electrode formation portion.

Meanwhile, 1.8 g of sulfur and 0.2 g of acetylene black (having a specific surface area of 68 $m^2/g$ and DBP oil absorption of 170 $cm^3/100$ g, manufactured by Denka Company Limited) were weighed and taken into an agate mortar, and mixed with each other while pulverizing for 15 minutes. Then, N-methyl-2-pyrrolidone was added thereto little by little to prepare viscous slurry. The slurry was taken at the end of the glass rod, applied to the center portion of the positive electrode formation portion of the LLZ molded body, and the slurry was leveled by allowing the end face of a slide glass to reciprocate two or three times, such that the slurry was spread through the entire positive electrode formation portion. Subsequently, the slurry was dried using a vacuum dryer at 80° C. whole day and night to completely remove N-methyl-2-pyrrolidone, and then the masking tape was peeled off. Thus, a positive electrode having a diameter of 8 mm and a thickness of about 0.09 mm was formed on the LLZ molded body.

Since a mass of the LLZ molded body on which the positive electrode had been formed was 0.2673 g, a mass of the formed positive electrode was 0.0026 g, and therefore the sulfur content in the positive electrode was 2.34 mg.

Using a commercially available SUS battery cell case for an electrochemical test, a copper foil (diameter: 23 mm, thickness: 20 μm) as a current collector was placed at a case side, and a lithium foil (diameter: 8 mm, thickness: 600 μm) as a negative electrode was mounted on the copper foil. Subsequently, the LLZ molded body was mounted such that a sputtered layer of gold is overlapped onto the lithium foil, and the lithium foil was brought into close contact with the LLZ molded body by heating at 120° C. A stainless steel foil (diameter: 8 mm, thickness: 20 μm) as a positive electrode current collector was mounted on the positive electrode of the LLZ molded body. Thus, a battery cell was assembled with a top cap closed.

After the battery cell was stored at 105° C. for 12 hours, the Cyclic voltammetric (CV) measurement was carried out under measurement conditions of potential scan range of 1.0 V to 3.5 V, scanning speed of 3 mV/min, and at 60° C. The results are shown in FIG. 1.

Example 2

A positive electrode was formed on an LLZ molded body in the same manner as in Example 1 using a disk-shaped LLZ molded body (having a diameter of 11 mm, thickness of 0.53 mm, and mass of 0.2766 g) other than the LLZ molded body used in Example 1. A mass of the formed positive electrode was 0.0007 g, and the content of sulfur in the positive electrode was 0.63 mg. A coin-type battery cell was assembled in the same manner as in Example 1 using the LLZ molded body on which the positive electrode was formed.

After the battery cell was stored at 120° C. for 12 hours, the Cyclic voltammetric (CV) measurement was carried out under measurement conditions of potential scan range of 1.0 V to 3.5 V, scanning speed of 3 mV/min, and at 60° C. The results are shown in FIG. 2.

Figure 2:
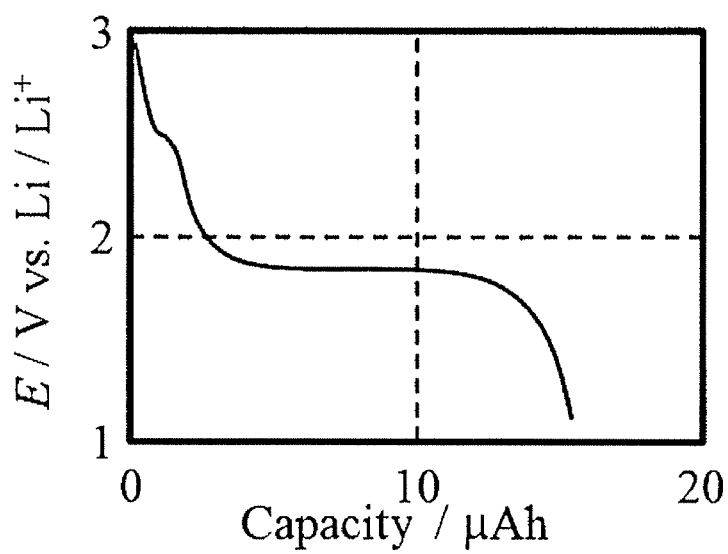
FIG. 2 is a view showing a result of measurement of a discharge curve by cyclic voltammetry (CV) of an all-solid-state lithium-sulfur battery of Example 2.

FIGS. 1 and 2 show that since an open circuit voltage of a battery is 3 V in both Examples 1 and 2, the LLZ molded body is an excellent electrolyte that does not cause internal short circuit. At the time of discharging, a stable discharge curve is shown from 3 V to 1 V, and therefore, it can be said that a lithium-sulfur battery using the LLZ molded body has a function as the storage battery. That is, it is shown that when the lithium-lanthanum-zirconium composite oxide (LLZ) is employed as the solid electrolyte, the lithium-sulfur battery can be made to be an all-solid-state battery.

Furthermore, Example 2 has battery characteristics having higher electric potential at each discharge plateau and smaller polarization than Example 1.

INDUSTRIAL APPLICABILITY

According to the present invention, since an interface between a positive electrode and a solid electrolyte as well as an interface between a negative electrode and a solid electrolyte can be made tight, an all-solid-state lithium-sulfur battery having high safety and excellent cycle characteristics can be provided.

The invention claimed is:

1. An all-solid-state lithium-sulfur battery comprising
a positive electrode that contains sulfur and a conductive material but that does not contain an inorganic solid electrolyte,
a negative electrode that contains lithium metal, and
a layer of a solid electrolyte interposed between the positive electrode and the negative electrode, wherein the positive electrode contains sulfur and conductive carbon black in a mass ratio of 70/30 to 95/5, and
the solid electrolyte is an oxide-based solid electrolyte, and
an electroconductive layer is not provided between the positive electrode and the layer of the solid electrolyte.

2. The all-solid-state lithium-sulfur battery according to claim 1, wherein the oxide-based solid electrolyte is lithium composite oxide.

3. The all-solid-state lithium-sulfur battery according to claim 2, wherein the lithium composite oxide is lithium-lanthanum-zirconium composite oxide.

4. The all-solid-state lithium-sulfur battery according to claim 3, wherein the lithium-lanthanum-zirconium composite oxide is a composite oxide further containing one or more elements selected from aluminum, tantalum, niobium, and bismuth.

5. The all-solid-state lithium-sulfur battery according to claim 1, wherein the positive electrode further contains a binder.

6. The all-solid-state lithium-sulfur battery according to claim 1, wherein the negative electrode is a lithium foil.

7. The all-solid-state lithium-sulfur battery according to claim 1, wherein an operating temperature is 110° C. or less.

8. A motor vehicle equipped with an all-solid-state lithium-sulfur battery according to claim 1.

9. An electric power storage system configured to supply electric power from an all-solid-state lithium-sulfur battery according to claim 1 to an electric power network, or to supply electric power from the electric power network to the all-solid-state lithium-sulfur battery.

10. A production method for an all-solid-state lithium-sulfur battery that comprises a positive electrode that contains sulfur but that does not contain inorganic solid electrolyte, a negative electrode that contains lithium metal, a layer of an oxide-based solid electrolyte interposed between the positive electrode and the negative electrode, the method comprising:
a step of attaching a masking tape with a portion for forming the positive electrode unmasked, at a positive electrode side of an oxide-based solid electrolyte molded body;
a step of forming the positive electrode on the oxide-based solid electrolyte molded body by applying positive electrode slurry containing sulfur and conductive carbon black in a mass ratio of 70/30 to 95/5 onto a portion of the oxide-based solid electrolyte molded body in a portion that is not covered with the masking tape at the positive electrode side, uniformly spreading the slurry, solidifying the slurry by vacuum drying, and then removing the masking tape; and
a step of assembling a cell by mounting a lithium foil on a negative electrode current collector, mounting the oxide-based solid electrolyte molded body such that a negative electrode surface is brought into contact with the lithium foil, and further mounting the positive electrode current collector on the positive electrode.

11. The production method for an all-solid-state lithium-sulfur battery according to claim 10, wherein the method for comprising heat-treating the lithium foil to bring the lithium foil into close contact with the solid electrolyte molded body, after mounting the oxide-based solid electrolyte molded body such that the negative electrode surface is brought into contact with the lithium foil.

12. The production method for an all-solid-state lithium-sulfur battery according to claim 10, wherein the oxide-based solid electrolyte is lithium-lanthanum-zirconium composite oxide.

13. The production method for an all-solid-state lithium-sulfur battery according to claim 12, wherein the lithium-lanthanum-zirconium composite oxide is a composite oxide further containing one or more elements selected from aluminum, tantalum, niobium or bismuth.

14. The production method for an all-solid-state lithium-sulfur battery according to claim 10, wherein the positive electrode slurry is obtained by adding an organic solvent to a mixture including 70 to 95% by mass of sulfur, and 5 to 30% by mass of conductive carbon black.

15. The production method for an all-solid-state lithium-sulfur battery according to claim 14, wherein the organic solvent is an organic solvent for a lithium ion battery.

16. The production method for an all-solid-state lithium-sulfur battery according to claim 10, wherein the positive electrode current collector is a stainless steel foil or an aluminum foil, and the negative electrode current collector is a copper foil.

* * * * *